United States Patent [19]

Buzbee et al.

[11] 3,877,787

[45] Apr. 15, 1975

[54] REFLEX LIGHT REFLECTORS

[75] Inventors: Lloyd R. Buzbee, Pittsburgh, Pa.; John D. Hite, Atlanta, Ga.

[73] Assignee: Koppers Company, Inc., Pittsburgh, Pa.

[22] Filed: Nov. 1, 1973

[21] Appl. No.: 411,629

Related U.S. Application Data

[63] Continuation-in-part of Ser. No. 215,653, Jan. 5, 1972, abandoned.

[52] U.S. Cl. .................. 350/105; 117/33; 350/109
[51] Int. Cl. ............................................. G02b 5/12
[58] Field of Search ......................... 350/97–109; 161/4, 5; 404/9–16; 260/2.5 B; 117/33

[56] References Cited
UNITED STATES PATENTS 2,218,909   10/1940   Gill, Jr. ................................ 117/33
2,294,930   9/1942   Palmquist .......................... 350/105
3,030,870   4/1962   Gill, Jr. ................................ 350/105
3,253,971   5/1966   Garling ............................... 350/109
3,355,311   11/1967   Gosselink ........................... 350/105
3,428,514   2/1969   Greer et al. ........................ 350/105

Primary Examiner—Alfred E. Smith
Assistant Examiner—Michael J. Tokar
Attorney, Agent, or Firm—Olin E. Williams; Oscar B. Brumback; Herbert J. Zeh, Jr.

[57] ABSTRACT

Improved reflex light reflectors are disclosed comprising a multiplicity of clear thermoset reflex reflective polyester beads affixed to a light reflective surface wherein the reflex reflective polyester beads are prepared by suspension polymerizing a curable resin composition comprising an unsaturated polyester resin and a vinyl monomer crosslinking agent in the presence of a water soluble salt.

23 Claims, 1 Drawing Figure

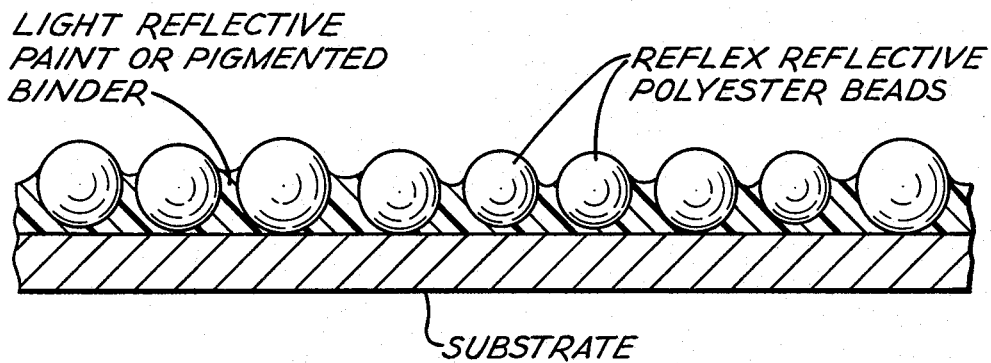

3,877,787

REFLEX LIGHT REFLECTORS

RELATED APPLICATIONS

This is a continuation-in-part of our copending application Ser. No. 215,653 filed Jan. 5, 1972, now abandoned.

BACKGROUND OF THE INVENTION

This invention relates to reflex light reflectors incorporating clear thermoset reflex reflective polyester resin beads. More specifically, this invention relates to light reflectors comprising a multiplicity of clear thermoset reflex reflective polyester beads affixed to a light reflective surface.

Reflex light reflectors of the type in which clear spherical bodies of relatively small diameter are affixed to a light reflective surface function in a manner such that light which strikes the spherical body passes therethrough and is reflected by the reflective surface back through the sperical body toward the source of light. A value of such reflectors is that they make objects to which they are attached readily or brilliantly visible in darkness when light shines on the objects.

Examples of widely used reflex light reflectors are the center and edge stripes of a roadway or highway. Such stripes comprise a reflective paint having thereon clear glass spheres or beads. As light from vehicle headlights strikes the glass sphere, it passes therethrough and is reflected by the paint back through the body toward the headlight and to the eyes of the vehicle driver. This aids the driver in guiding the vehicle to a much greater extent than if the light from the vehicle headlights were dissipated in all directions.

The aforementioned reflex light reflective paint stripes can be prepared by applying the reflective paint to the surface of the roadway and sprinkling the glass beads onto the paint before it dries. Thus applied, the lower portions of the beams are imbedded in the paint and the exposed top portions, uncoated by the paint, provide a ready-made reflex reflective medium. Alternatively, the glass spheres can be predispersed in the paint which is then applied to the surface of the roadway to form thereon light reflective stripes; such stripes have relatively poor reflex reflectivity until the layer of paint on the top portions of the glass beads is worn away by traffic or otherwise. Consequently it is necessary to drop some glass beads to supply initial reflex reflectivity. In addition the premix containing the glass beads is not stable because of the high density of the glass beads.

Other examples of the aforementioned type of reflex light reflectors include highway safety and traffic control signs.

For maximum effective use, the spherical bodies which are affixed to the light reflective surface must be clear, that is, substantially free of milky or cloudy appearance and substantially free of white or colored particles; also the bodies must be free of surface scratches and irregularities, free of voids or entrapped gas bubbles or other entrapped material and spherically shaped so that light which enters the body is reflected back through it instead of being scattered and/or absorbed. In addition, the reflex reflective spheres should have other properties such as, for example, chemical stability, stability to sunlight and moisture resistance.

REPORTED DEVELOPMENTS

Presently, the most widely used spherical bodies for reflex light reflectors are glass spheres, commonly referred to as glass beads. Notwithstanding their wide use, glass beads have shortcomings. Batches of glass beads usually contain significant amounts of nonspherical particles. Also, glass beads are discolored readily by sulfide pollutants in air and rain. In addition, glass beads are scratched and chipped relatively easily upon being handled before application and by traffic when they are used in light reflective paint stripes. The aforementioned shortcomings reduce the reflex light reflective properties of the glass beads. It is noted also that glass beads are relatively dense; thus, they are relatively heavy to handle and costly to transport. In addition it is extremely difficult to formulate a premix containing glass beads which has reasonable stability.

It is also known to prepare reflex light reflectors using beads or spheres made from polymeric resinous materials. For example, see Gill U.S. Pat. No. 2,218,909 which discloses the use of phenol formaldehyde resin beads in conjunction with a phenol formaldehyde resin lacquer or paint. In addition, see Garling U.S. Pat. No. 3,253,971 which discloses the use of plastic beads in reflex reflective surfaces. See also Gosselink U.S. Pat. No. 3,355,311 which discloses polymeric alkyl methacrylate beads and Greer et al. U.S. pat. No. 3,428,514 which discloses modified polymeric beads which are reflective. In addition seen Staehle et al. U.S. Pat. No. 2,376,252 which uses polymethyl metharcylate beads for preparing projection screens.

However, none of the above mentioned polymeric materials or any other known polymeric material have heretofore been used commercially. All of the polymeric beads heretofore prepared had shortcomings. For example, some of these polymeric beads were not thermoset and were adversely affected by heat. In addition materials such as they polyacrylates and some of the other materials are dissolved readily by the common paint thinners, gasoline and organic solvents. Another serious drawback is that many of the polymeric beads of the prior art were not as clear and reflex reflective as necessary for commercial application.

Therefore, in view of the above, it is the object of this invention to provide improved reflex reflectors, particularly improved reflex reflectors which are made with clear reflex reflective polymeric beads.

The attached drawing is a schematic diagram illustrating a magnified cross section of a reflex light reflector of this invention. With reference to the drawing, there is provided a layer of reflex reflective polyester beads of this invention. There is also provided a substrate which is usually a roadway, metal sheet, plastic sheet, wood surface or the like. The drawing also provides a light reflective paint or binder.

SUMMARY OF THE INVENTION

In accordance with this invention, there is provided a reflex light reflector comprising a multiplicity of clear thermoset polyester resin spheres or beads affixed to a light reflective surface. The thermoset polyester resin spheres used in the reflex light reflectors of this invention are clear, that is they are substantially free of a milky or cloudy appearance and are substantially free of white or colored particles. The beams are also substantially free of surface scratches and irregularities, substantially free of internal voids and entrapped gas bubbles or water. The polyester beads are susbstantially spherically shaped so that light which enters the spheres is reflected back through the spheres instead of being scattered and/or absorbed. The beads are also chemically stable and stable to sun light and moisture.

This invention is directed to improved reflex light reflectors of the type comprising clear reflex reflective spheres affixed to light reflective surfaces so that light which strikes the reflex reflective spheres passes through and is reflected by the reflective surface back through the sperical body toward the source of light. The improvement comprises using as the reflex reflective spheres clear thermoset polyester beads prepared by suspension polymerizing a curable resin composition of an ethylenically unsaturated polyester and a vinyl monomeric crosslinking agent in an aqueous suspension medium wherein the aqueous medium contains a water soluble salt in concentrations of at least about 1.0 percent by weight based on the weight of the aqueous medium.

The reflex light reflectors of the present invention will find wide use in applications where they are affixed to the surface of a trafficway. Such reflectors comprise a multiplicity of clear thermoset polyester beads affixed or adhered to a light reflective paint or binder affixed to the surface of a trafficway, including, for example, roadways, airport runways, parking ramps, etc. The polyester beads can be applied to such light reflective binders, which are known and commercially available, after the binder is applied to the surface of the trafficway, generally in the form of a stripe, and before the binder dries. Thus applied, the beads are partially imbedded in the binder and are adhered thereto when the binder dries or sets. On the other hand, the "trafficway" reflex light reflector can be prepared by applying to the surface of the trafficway a light reflective binder containing a multiplicity of predispersed clear reflex reflective thermoset polyester beads.

The reflex light reflectors of the present invention have a number of advantages over those known heretofore. For example, the clear cured polyester beads used in the reflectors are normally at least 20% more reflex reflective than glass spheres presently sold commercially for use with trafficway marking paints. Another advantage, is that the polyester beads have lower particle densities than glass spheres used conventionally in reflex reflective applications —for example, up to over 50% lower and within the range of about 1.1 to about 1.8 g/cc. This is important because a given weight of polyester beads can be used to cover a proportionally greater surface area than the same weight of glass spheres. In addition, the polyester beads can be readily prepared into a stable formulation with paint which cannot be done with the glass beads.

Compared to plastic spheres prepared according to the prior art methods, the clear cured polyester resin beads have one or more desirable characteristics, such as better solvent resistance, higher levels of clarity, better weathering characteristics, more uniformly and near perfectly spherically shaped bead surfaces which are free of surface irregularities, beads which are substantially free of internal voids, entrapped gas bubbles and entrapped water; and they do not flow at elevated temperatures.

DETAILED DESCRIPTION OF THE INVENTION

The improved reflex reflectors of the invention are a direct result of the use of the polyester beads of the invention. The polyester beads of the invention are clear, are descrete beads having a substantially spherical shape and are substantially free from internal voids, surface irregularities and encapsulated matter. The beads are thermoset, have excellent reflex reflective properties and are stable to light, chemicals and water. Polyester beads having these properties are prepared by suspension polymerizing a curable resin composition of an unsaturated polyester and a vinyl monomeric crosslinking agent in the presence of a water soluble salt. The beads are prepared by (a) forming an aqueous suspension of polymerizable liquid particles of a curable resin composition comprising an ethylenically unsaturated polyester and a vinyl monomeric crosslinking agent polymerizable therewith; the aqueous suspension contains a water soluble salt in concentrations of 1 % or more; the aqueous suspension optionally and preferably contains a suspending agent for maintaining the liquid particles suspended in the aqueous phase during the curing step; and (b) curing the liquid particles while in a dispersed state into discrete solid cured polyester beads having reflex reflective properties by polymerizing the unsaturated polyester and the vinyl monomer.

It has been found in accordance with this invention that excellent reflex reflectors may be prepared using polyester beads prepared by the aqueous suspension polymerization described herein. The use of water soluble salts in the aqueous suspension polymerization method described herein produces cured polyester beads of such good clarity that they have excellent reflex reflective properties. It is noted that the reflex reflective property of a material is directly related to the clarity of the material. The clearer the material the better the reflex reflective property. It has also been found that the use of a suspending agent in combination with the water soluble salt can be utilized effectively to produce cured reflex reflective polyester beads substantially, all of which are spherical and free from internal voids and surface irregularities. The polyester beads also have a controllable size and size distribution. The beads are also substantially free from water droplets and/or gas bubbles encapsulated within the cured bead.

The reflex reflectors made in accordance with this invention are superior to the prior art reflex reflectors because the polyester beads are superior to the prior art glass and plastic beads. The polyester beads used in the reflex reflectors of this invention are normally at least 20% more reflective than glass beads presently sold commerically for use with highway marking paints. Another advantage of this invention is that the beads have lower densities than glass beads used conventionally in reflex reflective applications— for example, often over 50% lower and within the range of about 1.1 to about 1.8 g/cc. This is important because a given weight of polyester beads can be used to cover a proportionally greater surface area than the same weight of glass beads. In addition, the polyester beads are easier to apply and can be premixed into a stable reflex reflective paint formulation.

Polyesters that are utilized in the practice of this invention are ethylenically unsaturated polyesters which are capable of reacting with vinyl monomeric crosslinking agents to form thermoset polyester resins. Generally speaking, the unsaturated polyesters can be prepared by reacting polycarboxylic acids or anhydrides with polyols wherein at least a portion of the acid or anhydride of said reactants contains polymerizable ethylenic unsaturation. The most popularly used unsaturated polyesters are those formed by condensing a monoethylenically unsaturated (usually alpha-beta unsaturation) dicarboxylic acid or an anhydride thereof with a diol. Examples of ethylenically unsaturated dicarboyxlic acids and anhydrides that can be used to prepared the unsaturated polyesters are maleic anhydride, fumaric acid, chlormaleic acid, itaconic acid, and mesaconic acid. Examples of diols that can be used to prepare the unsaturated polyesters are ethylene glycol, propylene glycol, butylene glycol, diethylene glycol, dipropylene glycol, triethylene glycol, isopropylidene bis-(p-phenyleneoxypropanol-2), cyclohexanedimethanol, neopentyl glycol, and cyclobutanediol.

Unsaturated polyesters of the type described above are often modified by including additional reactants in the condensation reaction. Some examples of such reactants are saturated dicarboxylic acids and anhydrides thereof, alcohols having more than two hydroxyl groups, acids either saturated or unsaturated, containing more than two carboxylic groups, and monofunctional acids and alochols. Specific examples of the aforementioned reactants are phthalic anhydride, isophthalic acid, tetrahydrophthalic anhydride, succinic acid, glutaric acid, adipic acid, pimelic acid, suberic acid, azelaic acid, sebacic acid, glycerol, pentaerythritol, trimellitic acid, pyromellitic acid, benzoic acid, and 2-ethylhexanol.

The acid number and the molecular weight of the unsaturated polyester, which is essentially a linear polymer, can vary over a wide range, for example, from near 0 to about 100 and from 500 to about 5,000 respectively. Most commercial polyesters, that is those that have a relatively good combination of physical, chemical and electrical properties, have an acid number within the range of about 5 to about 50 and a molecular weight within the range of about 1,000 to about 3,000.

Polyesters of the type described above are prepared according to well known techniques in which substantially stoichiometeric proportions of the acid and alcoholic reactants are polyesterified.

The particular unsaturated polyesters used in the practice of this invention should be selected on the basis of the properties desired in the final product. This selection can be made in accordance with known technology. Blends of two or more individual polyesters can be used to achieve the balance of properties desired. There are many types of readily available polyesters which can be made into beads having a good combination of physical and chemical properties which make them very suitable for use in the light reflective applications of this invention.

The vinyl monomeric materials which copolymerize with and crosslink with the unsaturated polyesters are well known compounds. Examples of such compounds, which it is noted contain a

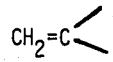

group, are styrene, vinyl toluene, diallylphthalate, alphamethyl styrene, divinyl benzene, chlorostyrene, methyl methacrylate and other lower alkylesters of acrylic and methacrylic acids. The term vinyl as used herein is also meant to cover allylic and vinylidene type monomers since they also contain the polymerizable

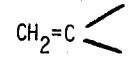

group.

The vinyl monomeric crosslinking agent used should be selected on the basis of the particular properties desired in the final product. Mixtures of two or more crosslinking agents can be used to achieve the properties desired. This selection can be made in accordance with known technology.

Cured beads made from a curable polyester resin composition that contains styrene have been found to have a good combination of properties. For reflex reflective applications in which it is important that the cured beads have particularly high ultraviolet stability, it is recommended that a mixture of styrene and lower akyl acrylates or methacrylates be used as the crosslinking agent.

The curable resin composition that is polymerized in accordance with this invention should be essentially immiscible or insoluble in the aqueous suspending medium so that it can be formed into discrete liquid particles. In addition, the curable resin composition should be essentially inert and nonreactive with respect to the aqueous medium of the suspension. For example, the use of unsaturated polyesters which contain liable halogen atoms such as alpha-haloaliphatic acids, which would tend to hydrolyze during exposure to the aqueous suspending medium, should be avoided.

The proportion of unsaturated polyester and vinyl monomeric crosslinking agent comprising the curable resin composition can vary over a wide range and can be selected in accordance with known technology to provide the properties desired in the final product. For example, the curable resin composition can comprise about 10 to about 90 wt. % of the unsaturated polyester and about 90 to about 10 wt. % of the vinyl monomeric crosslinking agent. A curable resin containing less than about 10 wt.% crosslinking agent tends to be too viscous to disperse readily into beads and one containing more than about 90 wt.% crosslinking agent tends to produce beads that are relatively cloudy and of poor solvent resistance; in addition, such resins cure relatively slowly. Preferably the curable resin should comprise about 20 to about 75 wt. % of the polyester and about 25 to about 80 wt. % of the crosslinking agent.

When utilizing a mixture of styrene and lower alkyl acrylates or methacrylates as the crosslinking agent, it is recommended that the styrene be present in an amount within the range of about 40 to about 95 wt. % and the alkyl acrylate or methacrylate in an amount within the range of about 5 to 60 wt. %. As mentioned above, the alkyl acrylate or methacrylate improves the ultraviolet stability of the beads. The higher the concentration of this type monomer the better the ultraviolet stability of the beads and the best stability can be attained by using the alkyl acrylate or methacrylate exclusively as the crosslinking agent; however, these monomers are relatively expensive and their presence reduces the chemical resistance of the beads. Thus, it is preferred to use them in conbination with styrene.

To accelerate the cure of the polymerizable polyester composition, initiators or catalysts should be incorporated in the resin. Examples of such materials include t-butyl peroctoate, methyl ethyl ketone peroxide, benzoyl peroxide, lauroyl peroxide, t-butyl peroxypivalate, and succinic acid peroxide. The catalyst should be preferably water insoluble because such catalysts, often referred to as "oil soluble" catalysts, are much more effective in accelerating cure than water soluble catalysts. The use of lauroyl peroxide is preferred; beads of excellent clarity have been prepared utilizing this catalyst.

The curing catalyst can be used in conventional amounts, for example about 0.1 to about 5% based on the weight of the polyester and crosslinking agents.

Promotors such as, for example, metal and amine promotors, can be used also to accelerate cure. Cobalt naphthenate is an example of a metal promotor and dimethylaniline is an example of an amine promotor. They can be used in conventional amounts, for example, about 0.05 to about 0.5 wt. % of the amine promotor and about 0.003 to about 0.1 wt. % of the metal promotor based on the weight of the polyester and crosslinking agent.

As mentioned above, polyester resin beads of improved ultraviolet stability can be prepared by utilizing a mixture of styrene and lower alkyl acrylates and/or methacrylates as the crosslinking agent. Improved ultraviolet stability can be achieved also by adding ultraviolet (UV) stabilizers to the reaction mixture. Available UV stabilizers can be used in conventional amounts. Examples of UV stabilizers are 4-dodecyloxy-2-hydroxybenzophenone and 2(2'-hydroxy-5'-methylphenyl)-benzotriazole. Exemplary amounts of UV stabilizers than can be used are about 0.02 to about 1% based on the weight of polyester and crosslinking agent.

As mentioned above the reflex reflectors of this invention are prepared with polyester beads made by suspension polymerizing a curable resin composition of an unsaturated polyester and a vinyl monomeric crosslinking agent in the presence of a water soluable salt. Suspension polymerization is also known as granular polymerization, pearl polymerization or bead polymerization. These terms are somewhat synonymous and in contrast to emulsion polyerization, bulk polymerization and solution polymerization. The practice of aqueous suspension polymerization is well known in the art. It involves suspending the monomer in water and while so suspended effecting polymerization. Heat and catalysts are usually employed as polymerization aids. The monomer may be maintained in a suspension state during the course of the reaction by agitation alone, however, it is preferred to stabilize the system with a suspending agent. After the polymerization is complete the polyester beads are recovered by filtration decantation, or centrifugation. The beads are then washed and dried and are then ready for use.

The suspension polymerization of the present invention must be carried out in the presence of one or more water soluble salts. Polyester beads which are prepared by a polymerization of the unsaturated polyestervinyl monomeric resin mixture in the absence of the salt yields cloudy and undersirable beads which cannot be used in the reflex reflectors of this invention.

The amount of water soluble salt that is necessary for acceptable clarity will depend to a certain extent on the particular curable resin compositions being employed, the presence or absence of a suspending agent, the type of suspending agent and other reaction variables. However, it is necessary for operable reflex reflective clarity that the salt concentration be at least 1% by weight. There is no critical maximum amount of salt that can be used for improving clarity. However concentrations greater than 20% by weight will seldom if ever be needed to achieve maximum clarity. In fact there is no noticeable increase in the effectiveness of improving clarity for salt concentrations greater than 20% as compared to salt concentrations of less than 20%. In addition high salt concentrations tend to decrease the effictiveness of many of the commonly used suspending agents. For example, high salt concentrations tend to salt out suspending agents such as polyacrylamides, polyvinylalcohols, and many other suspending agents. The salt concentrations for most salts will be in the range of from 1 to 15%, therefore, this is the preferred range. It should be noted that high salt concentrations greater than 20% may be desirable for adjusting the density of the suspension medium when curable resin compositions of high density are employed.

It has been found that almost any type of salt may be used in this invention. The important factor is that the salt be soluble in water. Numerous polymerizations have been carried out using a very wide variety of different salts. The results of these suspension polymerizations clearly illustrates the effectiveness of all types of salts. However, in addition to the requisite solubility there are two additional limitations on the types of salts that are useful. First of all the salts may not react to render the suspending agent inactive if one is employed. Also the salt must be chosen so that it does not react with the curable resin composition so as to objectionably effect the properties of the suspension or the resulting cured beads. For example, it is well known that most unsaturated polyesters have acidic terminal groups. The degree of acidic terminal groups is directly related to the acid number of the unsaturated polyester. Therefore salts which give a substantially basic reaction when dissolved in water should be avoided. Examples of some of these salts are sodium carbonate, sodium hydroxide, sodium acetate, and sodium benzoate. These bases react with the acid end groups and convert them into salts. This may result in beads of reduced clarity and/or emulsion being formed and the resulting cured particles being useless in the reflex reflectors of this invention.

While amost any water soluble salt which does not react with the curable resin composition or the suspending agent is useful there are some salts which are preferred. For example the alkaline and akaline earth metal halides particularly chlorides are very effective. These compounds are readily available, easy to handle, non-toxic and very effective in producing clear reflex reflective beads. It is also within the scope of this invention to use mixtures of one or more different water soluble salts.

As mentioned above it is impossible to produce optimum reflex reflective beads without the presence of salt in the aqueous suspension system. The improved clarity of the resulting beads is directly attributable to the presence of the salt. In addition, the presence of the salt has another beneficial function. During the normal suspension polymerization of polyester resin-vinyl monomer mixtures (ie without salt) a substantial amount of water is encapsulated or emulsified in the cured polyester bead. This water produces beads having cloudy spots. When large amounts of water become encapsulated or emulsified the entire bead may be cloudy or light traveling through the bead is undesirably refracted and/or reflected. In addition to affecting the reflex reflectivity of the beads the entraped water also affects the strength and other properties. However, when the suspension polymerization is preformed in the presence of salt as in the present invention the resulting beads are substantially free from entrapped water. In addition, the presence of salt helps to reduce the voids and other irregularities on the surfaces of the cured polyester beads.

The aqueous suspension polymerization of the present invention may be accomplished with or without a suspending agent. So long as the water soluble salt is present the resulting beads will have improved reflex reflective properties. The suspension may be maintained by agitation alone. The agitation may be accomplished by stirring, shaking, rotating, circulating pump, static mixer or any other device for agitating the suspension which is available. The bead and bead size distribution are dependent on agitation speed. In addition, a violet agitation will cause large quantities of encapsulated materials in the cured beads therefore gentle agitation conditions are preferred. However, as is realized by one of ordinary skill in the art, it is very difficult to maintain a suspension without the use of a suspending agent. The use of a suspending agent allows one to control the bead size, bead size distribution and bead shape. In addition the use of a suspending agent yields beads which have substantially less internal voids and surface irregularities when compared to beads prepared without a suspending agent. Therefore, it is preferred that the suspension polymerization be performed in the presence of a good suspending agent.

Numerous different types of suspending agents have been successfully employed in this invention. These suspending agents were both inorganic and organic, polymeric and nonpolymeric. In addition combinations or more than one suspending agent have been found to be effective. The suspending agent should be chosen so that the resulting suspension will yield beads of controlled size, controlled size distribution, substantially spherically shaped and free from surface and internal irregularities.

Some of the useful suspending agents are natural gums, dextrans, starch, cellulose, polyacrylamide, polyvinyl alcohol, gelatin, polyacrylic acid esters, copolymers of acrylic acid esters and acrylamide, acrylic acid polymers copolymers and salts thereof, polyethylene glycol esters, polymeric cationic quaternary ammonium compounds, tricalcium phosphate, barium sulfate, aluminum silicate and hydrated aluminum oxide. The preferred suspending agents are the organic suspending agents since they act as a protective colloid and the resulting beads are substantially spherically shaped and free from surface irregularities. Polyvinylalchols are a very useful and are one of the more preferred suspending agents.

The amount of suspending agent used in the aqueous suspension polymerization will tend to vary depending on the particular curable resin being polymerized and the extent to which the suspension is agitated. The amount of suspending agent should be at least sufficient to maintain the liquid polyester resin particles dispersed; the maximum amount will be goverened by the amount which will convert the suspension into an emulsion. Exemplary amounts of suspending agent that can be used are within the range of about 0.005 to about 5 wt. % based on the water in the suspending medium. However, for any particular system the most effective amount of suspending agent should be determined on the basis of experience. Generally the most effective concentrations will be in the range of 0.01 to 2.0% by weight for the polymerized protective colloid type suspending agents.

The aqueous suspension containing the water soluble salt and curable resin composition of this invention can be prepared as follows. The unsaturated polyester and vinyl monomeric crosslinking agent are combined. In general, this will produce a solution in which the polyester is dissolved in the monomeric crosslinking agent. The curing catalyst is added preferably to the resulting curable resin composition. The curable resin composition can then be added to water having dissolved therein the suspending agent and the water soluble salt. The volumetric proportion of water to curable resin composition can vary over a wide range. The volume of water should be at least sufficient to provide a low viscosity readily stirrable mixture in which the exothermic curing reaction is controlled readily and should not be so high that the amount of product produced per unit of reactor volume becomes unnecessarily low. Exemplary volumetric proportions of water to curable composition are from about 3:1 to about 1:1. However, it should be understood that smaller or larger volumetric proportions can be used.

The aqueous suspension of curable polyester resin should be agitated at least to the extent that the curable composition is maintained suspended therein in discrete liquid particle form. In general, the greater the agitation, the finer will be the particle size of the curable resin and the cured beads formed therefrom. The particle size and particle size distribution can be controlled by the extent to which the reaction medium is agitated when an effective suspending agent is utilized as well as to a lesser extent by the amount of and type of suspending agent.

As a result of the presence of the suspending agent and the agitation of the aqueous suspension, discrete spherical liquid particles of curable resin ranging in size, for example, from about 0.002 to about 0.2 inch can be produced. Cured spherical particles of polyester resin which correspond substantially in size to the uncured liquid particles are produced. The cured polyester beads prepared in accordance with this invention are truly thermoset, that is, they are incapable of fusing upon being subjected to heat.

In preparing the cured beads in a relatively short period of time, as described above, certain procedures should be followed. As mentioned above, a curing catalyst should be included in the curable resin. In addition, the reaction should be carried out at elevated temperatures wihtin the range of about 60°C up to the boiling point of the aqueous suspension, that is about 100°C. Higher temperatures can be used if the suspension polymerization is carried out under pressure. When utilizing promotors, temperatures within the range of room temperature or even lower can be used to cure the particles within about 30 minutes to about 2 hours.

Also, the reaction should be conducted in an oxygen-free atmosphere. The presence of oxygen particularly retards the final stages of curing resulting in high residual monomer levels unless prolonged reaction periods are employed. The oxygen free atmosphere can be accomplished by conducting the reaction under a blanket of inert gas, such as for example, carbon dixoide or nitrogen. Increased reaction rates can be obtained also by removing dissolved oxygen from the aqueous medium. This can be done conveniently by heating the aqueous medium at reflux and purging with inert gas such as nitrogen prior to adding the curable resin thereto.

The pH of the reaction medium should be maintained within the range of about 2 to about 8. At pH above 8, there is a tendency for the suspension to convert to an emulsion. Below a pH of about 2, relatively cloudy beads are obtained in some cases.

After the liquid curable polyester resin particles have been polymerized or cured, the reaction mixture can be cooled and the cured beads can be separated from the aqueous medium, for example, by filtering. The cured particles can then be washed, preferably with water, to remove any salt or suspending agent which remains on the surface of the beads. Optionally, additional water can be charged to the reaction medium after the cured particles have been formed and prior to cooling the reaction medium. It has been found that by charging additional water to the reaction medium, the cloudy suspending medium can be more readily removed from the cured particles. This sometimes improves the clarity of the particles. The amount of additional water charged will generally be about 20 to about 100% of the volume of the suspending medium.

After the particles are separated from the aqueous medium, additional suspending agent and water soluble salt can be added thereto to restore the concentrations of these materials to their desired levels. In addition, it may be necessary to adjust the pH to its desired range. Curable resin compositions can then be added and converted into cured particles.

The beads can be dried conveniently in an oven after they are separated from the aqueous medium. If a drying oven is used, it can be advantageous to also use it to completely cure particles which are not allowed to completely cure in the reaction medium; such particles can be removed from the reaction medium prior to being cured fully, thereby cutting down on reaction time.

The size of the polyester beads can vary over a wide range, for example, from about 0.002 to about 0.2 inches in diameter. For use in reflex light reflectors on the surface of a trafficway, it is preferred that the sphere size be no greater than about 0.05 inches in diameter. When the spheres are predispersed in a trafficway marking paint or binder, the minimum diameter of the spheres can be as small as about 0.002 inches. When the trafficway reflector is formed by applying the spheres to a wet paint stripe, the minimum diameter of the spheres can be advantageously larger, for example, about 0.003 inches. The larger size spheres, for example, about 0.05 to 0.2 inches diameter, can be used advantageously in other types of reflex light reflectors, for example, roadway safety and directional signs.

The size distribution of the spheres used in the reflectors will be governed generally by the specific application for which the reflector is used and can be determined best on the basis of experience. For exemplary purposes, there are set forth in Table I below Pennsylvania Highway Department specifications respecting the sphere size and the sphere-size distribution for light reflective spheroidal bodies for use in combination with light reflective paints.

Table 1

Sphere Size Distribution

| U.S. Standard Sieve Series, No. | Wt. % Passing |
| --- | --- |
| 16 | 100 |
| 20 | 98–100 |
| 30 | 70–90 |
| 50 | 20–40 |
| 100 | 0–5 |
| 200 | 0–1 |

The above specifications respecting sphere size distribution are typical of those adopted by other states. Reflex light reflectors within the scope of this invention can be prepared by affixing to a light reflective paint clear thermoset reflex reflective polyester beads having such sphere-size distribution to satisfy the aforementioned specifications. It is noted that the sieve openings for above sieve series nos. (16–200) are about 0.05 to 0.003 inches respectively. Thus beads with diameters ranging from about 0.003 to 0.05 inches may be used satisfactorily.

As to other properties of the polyester beads, they should have reflex reflectivity properties over a wide range of angles of illumination, varying from about 1° to about 90°, and a refractive index within the range of about 1.5 to about 1.7 or higher. The density of the spheres are generally about 1.1 to about 1.8. In addition, the resinous spheres will generally have good chemical stability, UV stability, moisture resistance and crush resistance, the last mentioned property being particularly important when the spheres are used on the surface of a trafficway. One or more of these properties can be improved by selecting certain types of polyester resins for preparing the spheres as will be explained in detail below.

The clear polyester resin spheres can be attached or affixed to any suitable light reflective surface. Examples of light reflective surfaces include light reflective paints or binders and pigmented plastic binders which are applied to any convenient substrate such as a roadway, a metal sheet, a plastic sheet or a wood surface.

In preparing reflectors for use on the surface of a trafficway, such as the center or edge stripes of a roadway, a light reflective paint can be applied to the surface of the roadway and thereafter and before the paint dries a multiplicity of the polyester resin spheres can be applied to the wet paint by any suitable means, for example, by sprinkling thereon. When the paint dries or sets, the spheres become firmly adhered thereto. On the other hand, the spheres can be added to the light reflective paint and the paint having the spheres dispersed therein can be applied to the surface of the trafficway. Such light reflective paints can comprise about 10 to about 60 volume % of the cured polyester resin spheres.

Speaking generally, the spheres should cover substantially the entire surface of the paint stripe, preferably in the form of a monolayer of spheres. It can be appreciated that due to the relatively small size of the spheres, for example, about 0.002 to about 0.05 inches, about 60,000 to about 40,000,000 spheres will be present for every square foot of stripe.

Examples of the light reflective paints that can be used in the reflex light reflectors of the present invention include those having a medium length soya/phthalic anhydride vehicle containing high volatile petroleum thinners, driers and anti-skinning agents. Pigments for these paints include rutile, calcium, and magnesium silicate and chrome yellow along with suspending agents. Such paints are readily available and are sold commercially. Examples of commercially available paints are; traffic marking paints sold by Pittsburgh Paints Co. and Baltimore Paint and Chemical Corporation.

In preparing other types of reflex light reflectors, the clear cured polyester resin spheres can be used with a variety of types of light reflective surfaces such as pigmented thermosetting resins, for example, polyesters and epoxies, and pigmented thermoplastic resins, for example, polyacrylates and polyvinyl chloride.

Numerous experiments have been performed which demonstrate the effectiveness of the invention. The following are examples of some of these experiments. They should be construed to illustrate the invention but should not be construed to limit the same.

Unless otherwise stated, the cured polyester resin beads of the examples were prepared utilizing the following equipment and procedure. The equipment included a 500 ml round bottom flask equipped with a paddle type stirrer, thermometer, reflux condenser and means for maintaining a nitrogen atmosphere. There was added to the flask 200 ml of distilled water and the water soluble salt. Dissolved air in the water was removed by heating at reflux and purging with nitrogen and a nitrogen atmosphere maintained during the remainder of the reaction. Thereafter, the water was cooled to 70°C. The suspending agent, when used, and 100 g of the curable composition containing a catalyst were added to the water without stirring. The aqueous composition was then stirred to the desired level and liquid particles of the curable composition were formed and dispersed in the aqueous medium. This aqueous suspension was heated by an electric mantel to cure the liquid particles. After the particles were cured, the reaction mixture was cooled to 50°C. or less and the particles were separated and washed with distilled water by decantation and filtration. The cured particles were spread in a thin layer and air-dried overnight at room temperature.

The first group of examples reported in Table I below shows that reflex reflective polyester beads of improved clarity can be prepared by utilizing a water soluble salt such as sodium chloride in the reaction mixture. The examples show also that the beads can be prepared in a relatively short period of time, for example, less than 1 hour. The curable resin comprised 60 wt. % styrene and 40 wt. % of an unsaturated polyester having an acid number of about 30 and a molecular weight of about 1500 and prepared by reacting propylene glycol, diproplyene glycol, isophthalic acid and maleic anhyride in molar proportions of 1.73/0.84/1/1.4 respectively. The curing catalyst was t-butyl peroctoate in an amount of 1 part/100 parts of the curable resin. A suspending agent of polyvinyl alcohol (Elvanol 50-42) was present in an amount of 0.1 part/100 parts of water. The reaction mixture was stirred at the rate of 220 rpm. The amounts of NaCl and the curing or heating conditions used are set forth in the table.

Table 1

| Ex. No. | Amount of NaCl, Parts/ 100 Parts Water | Bead Clarity Rating |
| --- | --- | --- |
| 1 | 0 | 10 |
| 2 | 1 | 2-3 |
| 2a | 2 | 2 |
| 2b | 5 | 2 |
| 3 | 10 | 2 |

The clarity of the cured beads was examined with a microscope. The beads were assigned relative clarity values ranging from 2 to 10. This rating system is discussed later herein.

With reference to Table 1 above, the cloudy beads of Example 1, prepared in the absence of NaCl, appeared milky and were not transparent when viewed under a microscope. However, those of Examples 2 and 3, prepared in the presence of NaCl, were almost completely transparent when viewed under the under a microscope.

The next group of examples in Table 2 below shows the preparation of clear thermoset polyester resin beads prepared in reaction media that contained varying amounts of polyvinyl alcohol, suspending agent and NaCl in an amount of 10 parts/100 parts of water. The curable resin comprised 60 wt. % styrene and 40 wt. % of the unsaturated polyester used in Example Nos. 1-3. The catalyst was t-butyl peroctoate in an amount of 1 part/100 parts of the curable resin.

Table 2

| Ex. No. | Amt. of Polyvinyl Alcohol, Parts /100 parts of Water | Stirring Rate rpm | Heating Conditions Time in Min. | | | Description of Cured Beads |
| --- | --- | --- | --- | --- | --- | --- |
| | | | 60-75°C | 75-90°C | 90-98°C | |
| 4 | 0.01 | 200 | 6 | 33 | 12 | light clumping, clear beads |
| 5 | 0.025 | 220 | 6 | 18 | 5 | no clumping clear beads |
| 6 | 0.05 | 220 | 6 | 14 | 16 | light clumping clear beads |
| 7 | 0.1 | 220 | 5 | 16 | 10 | no clumping, clear beads |
| 8 | 0.1 | 220 | 5 | 25 | 15 | no clumping, clear beads |
| 9 | 0.2 | 200 | 4 | 18 | 35 | no clumping, clear beads |

The beads of Examples 4-9 above were nearly free of agglomerated beads and were free of cloudiness. For the curable resin used in these examples, relatively small amounts of polyvinyl alcohol were effective in maintaining stable suspensions. The beads ranged in size from about 40 to about 120 mesh and were perfectly spherical under microscopic examination. It is noted that the total curing times for the beads ranged from 29 to 57 minutes. The purpose of curing the beads progressively at higher temperatures was to facilitate control of the exothermic reaction which without control would go to reflux. Reflux during early stages of cure has been found to increase cloudiness.

As mentioned hereinabove, the sizes and distribution of sizes of cured beads produced will tend to vary depending on the curable resin used, the viscosity thereof, the rate at which the reaction medium is stirred, the suspending agent employed, etc. The examples in Table 3 below illustrate the preparation of various sizes of cured beads from different curable resins and under different reaction conditions. (In all of the examples herein, the screen no. refers to U.S. Standard Sieve Series.) The curing catalyst was t-butyl peroctoate in an amount of 1part/100 parts of curable resin and the curable resins used in the Examples of Table 3 were as follows:

A 70 wt. % styrene and 30 wt. % of an unsaturated polyester prepared by reacting propylene glycol, phthalic anhydride and maleic anhydride in a molar ratio of 3/2/1 respectively;

B 70 wt. % styrene and 30 wt. % of an unsaturated polyester prepared by reacting the reactants of A above, but in a molar ratio of 3/1/2 respectively;

C 22 wt. styrene and 78 wt. % of an unsaturated polyester prepared by reacting propylene glycol, dipropylene glycol, isophthalic acid and maleic anhydride in a molar ratio of 1.73/0.84/1/1.40 respectively;

D 60 wt. % styrene and 40 wt. % of the unsaturated polyester of C above;

E 36 wt. % styrene and 64 wt. % of an unsaturated polyester prepared by reacting propoxylated bisphenol A, propoxylated tetrabromobisphenol A and either fumaric acid or maleic anhydride. (This is a commerical product sold as Atlac 711 by Atlas Chemical Co. The exact proportion of reactants is unknown.)

Examples of bead sizes that can be produced in accordance with the present invention are illustrated in Table 3 above. Comparison of the beads of Examples 12 and 13 shows that smaller beads are produced by increasing the rate of stirring for this system. A comparison of the beads of Examples 13 and 14 shows that the beads of Example 13 are larger than those of Example 14. The beads of these examples were prepared from the same curable resins except that the resin of example 13 contained less styrene, and therefore, was more viscous (the curable resin C of Example 13 had a viscosity of 160 poises and the curable resin D of Example 14 had a viscosity of 2 poises). Other factors being equal, the higher the viscosity of the curable resin, the larger the bead size. It is noted that the curable resin of Examples 15 and 16 had a density very close to the density of the NaCl solution. This permits the formation of stable suspensions at low stirring rates. The use of the Morton flask in preparing the beads of Examples 17 and 18 permitted the rate of stirring to be increased without giving a splashing action or without giving a pronounced vortex which exposes a significant portion of the stirring paddle. Splashing type stirring produces beads containing gas bubbles and entrapped water; this is not desirable for beads which are to be used in reflex reflective applications. It can be seen that control of variable such as, for example, those described above can be exercised to produce cured beads within a desired range of sizes.

As set forth hereinabove, the use of a water soluble salt such as sodium chloride is critical for producing cured polyester resin beads of improved clarity. The use of the suspending agent facilitates the control of bead size, bead shape, bead size distribution and the like. The next group of examples reported in Table 4 below illustrates the use of different curable resins and the extent to which the cured thermoset particles produced from these resins can vary in clarity depending on the amount of vinyl monomer that is employed with the different polyesters.

In preparing the cured beads of the examples in Table 4 below, 0.2 g of polyvinyl alcohol and 10 g of sodium chloride were added, with stirring, to 200 ml of water contained in the reaction flask, after which the

TABLE 3

| Ex. No. | Curable Resin | Amounts in parts/ 100 parts of water | | Stirring Rate rpm | Heating Conditions | | | | Bead Size | | | | |
|---|---|---|---|---|---|---|---|---|---|---|---|---|---|
| | | Polyvinyl alcohol | NaCl | | 60–75°C | Time in min. 75–90°C | 90–98°C | 14 | Wt. 20 | % 30 | Passing 40 | Screen 60 | No. 100 |
| 10 | A | 0.1 | 5 | 130 | 2 | 6 | 60 | | 72 | 29 | 1 | | |
| 11 | B | 0.1 | 5 | 160 | 3 | 5 | 60 | | 92 | 46 | 1 | | |
| 12 | C | 0.1 | 5 | 112 | 7 | 17 | 20 | 40 | | | | | |
| 13 | C | 0.1 | 5 | 140 | 4 | 10 | 13 | 65 | | 13 | | | |
| 14 | D | 0.1 | 5 | 180 | 4 | 16 | 22 | | | 99 | | | 1 |
| 15 | D | 0.1 | 10 | 240 | 5 | 16 | 19 | | | 93 | | | 2 |
| 16 | D | 0.1 | 10 | 200 | 4 | 18 | 35 | | | | 93 | | 1 |
| 17 | D | 0.2 | 5 | 370(1) | 6 | 8 | 45 | | | | | 100 | 11 |
| 18 | E | 0.2 | 5 | 370(1) | 4 | 20 | 30 | | | | | 100 | 2 |

(1)The beads of these examples were prepared in a Morton flask, the walls of which are symetrically creased in 4 places, as distinguished from the round bottom flask that was used for preparing the beads of other examples.

water was heated to a reflux and swept with nitrogen to remove all air. (A nitrogen atmosphere was maintained throughout the reaction.) Thereafter, the aqueous medium was cooled to 70°C for 3–10 minutes. The temperature was maintained for 1 hour at 75°–80°C, for 0.5 hour at 87°–90°C and at 95°–98°C for 0.25 hours. The contents of the flask were cooled rapidly to about 30°C and the cured beads were then poured on a No. 325 sieve. The beads were reslurried in water, filtered on a sintered glass funnel, allowed to dry overnight and dried finally in an oven at 65°–70°C for several hours.

The clarity of the cured beads was examined with a microscope. The beads were assigned relative clarity values ranging between 2 and 10. A clarity rating of 2 was assigned to those beads which contained only a barely discernible level of cloudyness or specks; and a clarity rating of 10 was assigned to those beads which were completely milky white in appearance. Beads varying in clarity between these two degrees were rated accordingly. For use in most commercial reflex reflective applications, beads having a clarity rating of no greater than about 4 are necessary with beads having a clarity of 2 or 2+ being desirable.

There is set forth in Table 4 also the yields of beads produced, that is, the percent of beads produced based on the resin charged to the reactor, and the final pH's of the suspending mixtures measured at room temperature after the reactions were terminated.

ter results with this resin formulation would be obtained if the reaction conditions were modified somewhat, for example by increasing the concentration of the suspending agent.

As a further illustration of sizes of beads that can be prepared in accordance with this invention, there is set forth below the size distribution of the beads of Examples Nos. 28, 29 and 31.

| Beads of Example No. | Wt. % Passing Screen Nos: | | | | |
|---|---|---|---|---|---|
|  | 14 | 20 | 30 | 50 | 100 |
| 28 | 100 | 98.5 | 98 | 17 | 1.6 |
| 29 | 100 | 99.5 | 98.5 | 58 | 2 |
| 31 | 100 | 100 | 98.5 | 40 | 1.7 |

The examples in Table 5 below show the preparation of cured beads from a suspension polymerization reaction mixture that contained also a UV stabilizer. Compared to the previous examples, larger quantities of reactants were used in the examples of Table 5. The reaction was carried out in a 5 liter 3-neck flask equipped with a paddle stirrer, thermometer, and condenser. An amount of water which was twice that of the curable resin was added to the flask along with 0.1 part and 5 parts/100 parts based on the water of a polyvinyl alcohol suspending agent and sodium chloride respectively.

Table 4

| Ex. No. | Polyester | Curable Resin Amount of Polyester, Wt. % | Styrene Wt. % | Stirrer Speed rpm | Final pH | Yield % | Clarity Rating |
|---|---|---|---|---|---|---|---|
| 19 | PE(1) | 50 | 50 | 280 | 2.3 | 98 | 4 |
| 20 | " | 30 | 70 | 280–288 | 2.4 | 98 | 7 |
| 21 | " | 10 | 90 | 290–284 | 2.7 | 89 | 6 |
| 22 | PE(2) | 50 | 50 | 276 | 2.5 | 98 | 2 |
| 23 | " | 30 | 70 | 284 | 2.55 | 99 | 5 |
| 24 | " | 10 | 90 | 280 | 2.8 | 97 | 10 |
| 25 | PE(3) | 50 | 50 | 284 | 2.5 | 98 | 3 |
| 26 | " | 30 | 70 | 279–280 | 2.6 | 98 | 9 |
| 27 | " | 10 | 90 | 280 | 2.8 | 95 | 10 |
| 28 | PE(4) | 50 | 50 | 276 | 3.1 | 99 | 2 |
| 29 | " | 30 | 70 | 280–292 | 3.2 | 98 | 2 |
| 30 | " | 30 | 70 | 180 | — | 96 | 2 |
| 31 | " | 10 | 90 | 276 | 3.7 | 99 | 6 |

(1)polyester prepared by reacting propylene glycol, phthalic anhydride and maleic anhydride in molar ratios of 3/2/1.
(2)polyester prepared by reacting the reactants of (1) above, but in molar ratios of 2/1/1.
(3)polyester prepared by reacting the reactants of (1) above but in molar ratios of 3/1/2.
(4)polyester prepared by reacting diprophylene glycol and maleic anhydride in equimolar amounts.

From the examples reported in Table 4 above, it can be seen that generally, the clarity of those beads made from the curable resins that had lower proportions of styrene was better than those made from the resins that contained higher proportions of styrene. It was observed also that the cured beads prepared from the curable resins that had lower proportions of styrene tended to be smoother and more uniformly shaped in the form of perfect spheres, as viewed under a microscope, than those made from the resins that contained the higher proportions of styrene. The percents of beads which agglomerated for all of the examples were relatively small, ranging from about 1 to about 10 wt. % depending on the curable resin used, except for Example No. 21 in which 50–70 wt. % of the beads were agglomerated; this was attributed to the extremely high level of styrene in the resin and the low levels of fumarate unsaturation in the polester. It is believed that bet- The UV stabilizer identified in Table 5 was added to the curable resin composition. The aqueous medium was heated to reflux with stirring and swept with nitrogen to remove all air. (A nitrogen atmosphere was maintained throughout the reaction.) The aqueous medium was cooled to 70°C, stirring was terminated and the amount of curable resin identified in Table 5 below was charged to the flask. The curable resin contained 70 wt. % styrene and 30 wt. % of an unsaturated polyester prepared by reacting equimolar amounts of dipropylene glycol with maleic anhydride; in addition, the curable resin contained 1.0 part/100 parts based on the curable resin of lauroyl peroxide. The reaction mixture was stirred and heated to 75°C. The temperature was maintained at 75°C for 1 hour with a water bath which may also be used to control the initial exotherm. Thereafter the reaction mixture was maintained at 87°–91°C for 0.5 hour and then at 95–98°C for 0.25 hour. The reaction mixture was cooled to about 30°C and poured on a No. 325 sieve. The cured beads were reslurried in water, filtered on a sintered glass funnel, allowed to dry overnight and then dried in an oven at 60°–75°C for several hours.

TABLE 5

| Ex. No. | Curable Resin, g | UV Stabilizer and Amt. in parts/ 100 parts of resin | Speed rpm | % Yield | Clarity |
| --- | --- | --- | --- | --- | --- |
| 32 | 1000 | None | 176 | 98 | 2 |
| 33 | 1250 | DOBP/0.25[1] | 160 | 98 | 2 |
| 34 | 1250 | DOBP/0.5[1] | 176 | 98 | 2 |
| 35 | 1250 | TP/0.25[2] | 156 | 98 | 2 |
| 36 | 1250 | TP/0.5[2] | 132 | 99 | 2 |

[1] 4-dodecyloxy-2-hydroxybenzophenone (sold by Eastman Chemical Products, Inc. as DOBP)
[2] 2-(2-hydroxy-5 methylphenyl) benzotriazole (sold by Geigy Chemical Corp. as Tinuvin P)

The cured beads of Example Nos. 32–36 were subjected to accelerated UV stability tests. If was observed that the beads of Example Nos. 34 and 36 had the best UV stability and that those of Example Nos. 33 and 35 had better UV stability than the beads of Example No. 32. Although all of the beads had excellent clarity and were assigned a clarity rating of 2, it was observed that about 10% of the beads of Example Nos. 33 and 34 were somewhat less clear than the rest of the beads and these were assigned a clarity rating of 2–4. Similarly, about 5% of the beads of Example Nos. 35 and 36 were assigned a clarity rating of 2–4.

Beads of Examples 32–36 were tested for chemical stability by subjecting them for one week periods to 3N $H_2SO_4$, 0.25N NaOH, 0.25N HCl, water, 1M $CaCl_2$, and 50% $Na_2S$. The test evaluations showed no decomposition, change in color, surface etching, dulling, or other adverse change. On the other hand, glass beads in the presence of 0.25 N NaOH and 50% $Na_2S$ were found to have undergone a reduction in clarity, substantial surface etching and an increase in color.

Example No. 37 below shows the preparation of clear cured polyester resin beads from a curable resin which contains, as a crosslinking agent, a mixture of styrene and methyl methacrylate.

Example No. 37

The beads of this example were prepared from a curable resin which was the same as that of Example No. 32 except that equal weights of styrene and methyl methacrylate were used. The amounts of Polyvinyl alcohol, NaCl and lauroyl peroxide curing catalyst were the same as those used in Example No. 32. The suspension polymerization of the curable resin was carried out under conditions which were essentially identical with those of Example No. 32.

All of the beads of Example No. 37 had excellent clarity and were assigned a clarity rating of 2. Upon subjecting the beads of Example 37 to an accelerated UV stability test, it was found that they were even more stable than the beads of examples 34 and 36 Table 5. Testing showed that the beads of Example No. 37 had better crush resistance than those of Example No. 32.

The refractive indices of Example Nos. 32 and 37 were measured before and after accelerated UV stability tests. After 7 days exposure to the test, it was found that the refractive index of the beads of Example No. 32 was the same as that before the test. After 24 days exposure to the test, the beads of Example No. 37 had a refractive index which was the same as its pre-test value.

The beads of Example No. 35 having a refractive index of 1.56 were waterproofed with a mixture of dimethyl dichlorosilane and trimethyl chlorosilane; (sold by General Electric Co. as Dri-Film SC-77). The waterproofed beads had a refractive index of 1.56. It was found also that water-proofing the beads had little or no adverse affect on the UV stability of the beads.

Different sets of samples of conventionally used glass beads and cured clear polyester resin beads were applied to a white traffic marking paint for the purpose of comparing various properties of the beads. The following procedure was used. A coating of conventional white, traffic marking paint, 2 mils in thickness and 2 inches wide was applied to a 4 × 12 inches glass panel which had been sprayed previously with a base coat of the white paint to provide a near opaque background. Immediately after the application of the 2 inches strip of paint, beads were sprinkled on it. After removing excess beads by inverting the glass panel, the test samples were placed in an oven having a temperature of 50°C for 0.5 hour to accelerate drying. Loose beads were removed by lightly brushing the surface. A monolayer of closely packed beads adhered to the white paint strip was produced.

The polyester resin beads applied to the paint strip were those of Example No. 32 in Table 5 above. The glass beads utilized on the other set of paint strips were obtained from the Pennsylvania Highway Department and are typical of glass beads employed with traffic marking paints. Testing of the reflex reflectivity properties of the glass and polyester resin beads of the paint strips showed that the latter were substantially more reflectant than the former over a wide range of angles of illumination. By way of example, it is noted that the reflectivity of the polyester resin beads at an angle of illumination of 3° was approximately 20% greater than that of the glass beads.

Additional test specimens having the glass beads and polyester resin beads on strips of white traffic marking paint as decribed above were exposed to outdoor weather conditions for a 3 month period to determine relative weatherability and reflex reflectivity properties after outdoor exposure. This series of tests included also an evaluation of the cured polyester resin beads of Example Nos. 33–37. At the end of the 3 month test period, it was found that although the resistance to yellowing of the glass beads was generally better than that of the cured polyester beads, the reflex reflectivity properties of the polyester beads were in general better than those of the glass beads. It is noted also that the resistance to yellowing of the glass beads was only slightly better than the polyester beads containing the UV stabilizer (Examples 33–36). Of the different polyester beads tested, those of No. 33–36 which contained the UV stabilizers and of Example No. 37 which included methyl methacrylate as a crosslinking agent resisted yellowing better than those of Example 32 which contained no UV stabilizer and which contained styrene only as the crosslinking agent.

A series of experiments were performed which demonstrate the need for salt in order to make beads of improved clarity via suspension polymerization. In addition, the experiments demonstrate the effectiveness of the salt in preventing encapsulation of water and irregularities of the bead surfaces. The experiment also illustrates that all different types of water soluble salts are effective. The results of the series of experiments are illustrated in Table 6 below.

The unsaturated polyester-vinyl monomer resin composition was (a) 30% of an unsaturated polyester prepared by reacting dipropylene glcyol and maleic anhydride in approximately equal molor amounts and having an acid number of about 8 and a molecular weight of about 1200 and (b) 70% styrene. A polyvinyl alcohol suspending agent was employed at a concentration of 0.1 parts per hundred. A lauroyl peroxide catalyst was employed at a concentration of 1% based on the curable resin composition. The procedure employed was similar to that described for Example 1 above. The suspension was stirred at a rate of about 220 rpm.

As can be seen from Table 6 the presence of a water soluble salt is critical in order to obtain beads having improved clarity. When the suspension polymerization is performed uder similar conditions but without the water soluble salt the resulting cured beads are very cloudly and unacceptable. However, when salt is used a dramatic improvement in the clarity results. All of the usable salts gave greatly improved clarity and most of the salts gave beads of excellent reflex reflective clarity (2 to 3). In addition the salts also help reduce the amount of encapsulated matter in the cured bead and some of the salts affect bead shape and bead surface characteristics. Beads containing less than 10% irregular shaped beads and less than 10% encapsulated matter are desirable. However, some salts are more effective than others for controlling encapsulation and surface characteristics. Nevertheless the most critical factor is bead clarity.

In addition Table 6 illustrates that some care must be taken in selecting the salt which does not react with the polyester. A salt which gives a substantially basic reaction dissolved in water should be avoided. Such salts convert the acid end groups of the unsaturated polyester into salt groups. This results in destroying the suspension mechanism and the resulting cured beads are cloudy, irregular shaped and contain high concentrations of encapsulated water. This is illustrated by Examples 59, 60 and 61 from Table 6. It should also be remembered that the salt should not react with the suspending agent if one is used.

A series of experiments were performed which demonstrate that a variety of suspending agents are suitable in the suspension polymerization process of this invention. The results of this series are illustrated in Table 7 below.

Table 6

| Ex. No. | Salt | Salt Conct. phr. | Bead Clarity | % of Beads Having Irreg. Shape | % of Beads Containing Encapsulated Matter | Bead Surface Characteristics |
|---|---|---|---|---|---|---|
| 38 | None | — | 10 | 1–5 | 5–10 | Fair-Good |
| 39 | NaCl | 5 | 2- | 1 | 1 | Excellent |
| 40 | KCi | 8 | 2- | 1 | 1 | Excellent |
| 41 | CaCl$_2$ | 8 | 2-2+ | 1–5 | 1 | Good |
| 42 | MgCl$_2$ | 8 | 2 | 1 | 1 | Excellent |
| 43 | BaCl$_2$ | 8 | 2-2+ | 1 | 1 | Excellent |
| 44 | NH$_4$Cl | 8 | 2 | 1 | 1 | Good |
| 45 | LiCl | 5 | 3–4 | 1 | 1–5 | Poor |
| 46 | LiCl | 8 | 3 | 1 | 1–5 | Poor |
| 47 | MnCl$_2$ | 8 | 2- | 1–5 | 1–5 | Excellent |
| 48 | CuCl$_2$ | 8 | 2 | 1–5 | 1–5 | Excellent |
| 49 | NaBr | 8 | 2- | 1–5 | 1–5 | Excellent |
| 50 | MgBr$_2$ | 8 | 3–4 | 1–5 | 1–5 | Poor |
| 51 | NaNO$_3$ | 8 | 2+ | 1–5 | 1–5 | Fair |
| 52 | NaNO$_3$ | 7 | 2–3 | 1–5 | 1 | Good |
| 53 | NaNO$_3$ | 7 | 2+ | 1–5 | 1 | Good |
| 54 | NaNO$_3$ | 5 | 2+ | 1–5 | 1–5 | Good |
| 55 | Na$_2$SO$_4$ | 5 | 3+ | 1–5 | 1–5 | Poor |
| 56 | Na$_2$SO$_4$ | 1 | 3 | 1–5 | 1–5 | Good |
| 57 | AlCl$_3$ | 8 | 5 | 1–5 | 1 | Poor |
| 58 | Cu (NO$_3$)$_2$ | 8 | 3–4 | 1–5 | 1–5 | Good |
| 59 | Potassum Acid Phthalate | 5 | 10 | 1–5 | 50 | Poor |
| 60 | KCNS | 5 | 5 | 1 | 5–10 | Good |
| 61 | NaOAc | 8 | 10 | 1–5 | 50 | Good |
| 62 | Sodium Maleate | 5 | 10 | 50 | 50 | Poor |
| 63 | NaOOCCCl$_3$ | 8 | 2+ | 1–5 | 1–5 | Poor |

Table 7

| Ex. No. | Suspending Agent | Conc in Phr | Salt | Salt Conc in Phr | Bead Clarity | % of Beads Having Irreg. Shape | % of Beads Containing Encapsulated Matter | Beads Surface Characteristics |
|---|---|---|---|---|---|---|---|---|
| 64 | PVA | 0–1 | None | — | 10 | 1–5 | 5–10 | Fair |
| 65 | None | — | None | — | (Too poor to be measured) | | | |
| 66 | None | — | NaCl | 10 | 4 | 25 | 50 | Poor |
| 67 | Starch | 1.0 | None | — | 4 | 10–25 | 5–10 | Poor |
| 68 | Starch | 1.0 | KCl | 8 | 2 | 10–25 | 1–5 | Excellent |
| 69 | CMC | 0.25 | MgCl$_2$ | 8 | 2+ | 10–25 | 5–10 | Poor |
| 70 | CMC | 0.75 | MgCl$_2$ | 8 | 2 | 1–5 | 1–5 | Good |
| 71 | CMC | 0.75 | None | — | 10 | (Hollow Beads) | | |
| 72 | HEC | 0.5 | NaCl | 5 | 2 | 5–10 | 1–5 | Good |
| 73 | MAc/A | 0.625 | NaCl | 5 | 2 | 1–5 | 1–5 | Excellent |

Table 7 — Continued

| Ex. No. | Suspending Agent | Conc in Phr | Salt | Salt Conc in Phr | Bead Clarity | % of Beads Having Irreg. Shape | % of Beads Containing Encapsulated Matter | Beads Surface Characteristics |
|---|---|---|---|---|---|---|---|---|
| 74 | MAc/A | 1.56 | NaCl | 5 | 2 | 1–5 | 1–5 | Excellent |
| 75 | MMAc/A | 0.2 | NaCl | 5 | 2 | 1–5 | 1 | Good |
| 76 | MMAc/A | 0.2 | None | — | 6 | 5–10 | 5–10 | Good |
| 77 | TCP | 1.0 | NaCl | 5 | 5 | 25 | — | Poor |
| 78 | TCP | 1.0 | None | — | 10 | 25 | — | Poor |
| 79 | ASP600 | 1.0 | NaBr | 8 | 4 | — | — | — |
| 80 | ASP400 | 1.0 | NaCl | 5 | 2 | 1–5 | 1–5 | Good |
| 81 | BaSO$_4$ | 1.0 | NaCl | 5 | 2 | 1–5 | 1–5 | Good |

The results in Table 7 once again clearly shows the criticality of having salt present. In the absence of salt unacceptable beads are produced. In addition the results also illustrate why a suspending agent is preferred. Without a suspending agent the resulting beads are very irregularly shaped (not spherical and clumped together), have poor surface characteristics and large amounts of encapsulated water. The use of a suspending agent greatly improves the characteristics of the resulting cured beads. It should be noted with respect to the results shown in Table 7 that the optinum concerntrations, stirring speed, temperature and other operational variables were not worked out for all of the various suspending agents. However, the use of a suspending agent improves the bead characteristics and one skilled in the art may easily determine the optimum use of the various suspending agents.

In Table 7 above, CMC is carboxymethyl cellulose; HEC is hydroxyethyl cellulose; MAc/A is a copolymer of 80% acrylamide and 20%, methy acrylate; MMAc/A is a copolymer of 90; % acrylamide and 10% methylmethacrylate; TCP is tricacium phosphate and ASP 400 and 600 are commercially available aluminum silicate powders.

A series of experiments were performed which demonstrate that various resins and monomers at various ratios can be effectively utilized in preparing clear reflex reflective polyester beads when the suspension polymerization is carried out in accordance with this invention. The results are illustrated in Table 8 and the resins used were as follows.

Ex 82

70% styrene and 30% of an unsaturated polyester prepared by reacting dipropylene glycol and maleic anhydride in a molar ratio of about 1/1. The suspension polymerization was run with 0.1% PVA suspending agent and 10% NaCl.

Ex 83

50% styrene and 50% of an unsaturated polyester resin as in Ex 82. The reaction conditions were the same as in Ex 82.

Ex 84

30% styrene and 70% of an unsaturated polyester resin as in Ex 82. The reaction conditions were the same as in Ex 82.

Ex 85

50% styrene and 50% of an unsaturated polyester resin prepared by reacting propylene glycol, phthalic anhydride and maleic anhydride in an approximate molar ratio of about 2.1/1.0/1.0. The suspension polymerization was run with 0.1% PVA and 10% NaCl.

Ex 86

50% styrene and 50% of an unsaturated polyester prepared by reacting propoxylated bisphenol A and maleic anhydride and/or fumaric acid in approximate equal molar ratios. (This is a commercial product sold as Atlac 382 by Atlas Chemical Co. The exact proportions of reactants is unknown.) The suspension polymerization was run with 0.1% PVA and 10% NaCl.

Ex 87

50% styrene and 50% of an unsaturated polyester containing propoxylated tetrabromobis phenol A propoxylated bisphenol A and maleic anhydride and/or fumaric acid in approximately equal molor ratios. (This is a commercial product sold by Atlas Chemical Co. as Atlac 711. The exact proportion of reactants is unknown.) The suspension polymerization was run with 0.1% PVA and 10% NaCl.

Ex 88

70% styrene and 30% of an unsaturated polyester resin prepared by reacting propylene glycol, dipropylene glycol, isophthalic acid and maleic anhydride in a molar ratio of about 1.7/.85/1.0/1.4. The suspension polymerication was run with 0.1% PVA and 10% NaCl.

Ex 89

50% styrene and 50% of an unsaturated polyester resin prepared by reacting propylene glycol phthalic anhydride, and maleic anhydride in molar ratio of about 3.3/2.0/1.0. The suspension polymerization was run with 0.1% PVA and 10% NaCl.

Ex 90

Same as in Ex 89 except the unsaturated polyester had a molar ratio of about 3.1/1.0/2.0.

Ex 91

50% vinyl toluene and 50% of an unsaturated polyester resin prepared by reacting 1,4-cyclohexanedimethanol, neopentyl glycol, tetrahydrophthalic anhydride and maleic anhydride in a molar ratio of about 2/2/1/3. The suspension polymerization was carried out with 0.1% PVA and 10% CaCl$_2$.

Ex 92

50% styrene and 50% of an unsaturated polyester resin prepared by reacting propylene glycol, isophthalic acid and maleic anhydride in a molar ratio of about 2.15/1/1. The suspension polymerization was carried out in the presence of 0.1% PVA and 5% NaCl.

TABLE 8

| Ex. No. | Clarity | Ex. No. | Clarity |
|---|---|---|---|
| 82 | 2 | 87 | 3 |
| 83 | 2 | 88 | 2 |
| 84 | 2 | 89 | 3 |
| 85 | 2 | 90 | 3 |
| 86 | 3 | 91 | 2 |
|  |  | 92 | 2 |

Set forth below in an exemplary binder or paint composition that can be used in painting a light reflector on the surface of a highway.

| | Ex 93 Wt. % |
|---|---|
| 57 Wt. % Pigment Composition | |
| Rutile titanium Calcium Pigment | 64.5 |
| Calcium Carbonate | 34.5 |
| Suspending Agent | 0.5 |
| 43 Wt. % Vehicle Composition | |
| Medium Length SoyaOil-Phthalic Anhydride, Air Dry Type alkyd (50 wt. % solids) | 84.0 |
| V.M. and P Naphtha, Driers and Anit-Skinning Agent | 16.0 |

The next example shows a paint composition containing clear thermoset polyester resin spheres.

Ex 94

One part by weight of the clear cured polyester resin beads of Example No. 1 are added to 1.4 parts by weight of the paint composition of Example No. 11. The resulting paint composition contains about 50 volume % of the beads. If necessary, this paint composition can be thinned with additional V.H. and P naphtha to give a consistency desired for application.

As mentioned above one of the most important properties of reflex reflective beads is the refractive index. Most of the specifications for glass beads call for a refractive index of from about 1.50 to 1.65. The data is Table 9 shows the refractive indices for several of the polyester beads of this invention and compares their value to the refractive indices for few samples of commercial glass beads. The results show that the polyester beads of this invention have higher refractive indices than glass beads. The refractive index was determined by the liquid immersion technique in which beads in oils of known index were viewed under a microscope. The densities of the glass beads and polyester beads were also measured and the results are shown in the table. The densities of the polyester beads were found to be about 43–47% of that of glass beads. Therefore about 2.2 to 2.3 pounds of glass beads would be required to obtain the same coverage as one pound of polyester beads.

TABLE 9

| Beads | Refractive Index | Density |
|---|---|---|
| Glass | | |
| Catophote | 1.517 | 2.458 |
| Pa. Highway Dept. | 1.518 | 2.486 |
| Potter Bros. | 1.518 | 2.486 |
| Prismo-Universal | 1.516 | 2.467 |
| Polyester | | |
| Example No. 3 | 1.568 | 1.159 |
| 22 | 1.568 | 1.111 |
| 32 | 1.560 | 1.070 |

In summary and in view of the above, it should be appreciated that the present invention makes available improved reflex light reflectors which have numerous advantages over those heretofore known. The clear cured polyester beads included in the reflectors exhibit higher degrees of reflex reflectivity than conventionally used glass spheres and said resin spheres are less dense than said glass spheres. And the polyester resin spheres exhibit excellent weathering characteristics.

What is claimed is:

1. An improved reflex light reflector of the type comprising a multiplicity of clear reflex reflective spheres affixed to a light reflective surface and arranged so that light striking the spheres passes therethrough and is reflected by the light reflective surface back through the spheres toward the source of light wherein the improvement comprises using as the reflex reflective spheres polyester beads prepared by suspension polymerizing a curable resin composition of an ethylenically unsaturated polyester and a vinyl monomeric crosslinking agent in an aqueous suspension medium containing a water soluble salt.

2. A reflex reflector as in claim 1 wherein the salt is present in concentrations of at least 1.0 percent by weight based on the weight of the aqueous medium.

3. A reflex reflector as in claim 1 wherein the diameter of the polyester beads is from about 0.003 to about 0.005 inch.

4. A reflex reflector as in claim 1 wherein the aqueous suspension medium contains a suspending agent in a concentration of from about 0.005 percent to about 5.0 percent by weight based on the weight of the aqueous medium.

5. A reflex reflector as in claim 1 wherein the curable resin composition comprises from about 10 to about 90 percent by weight of the unsaturated polyester and from about 90 to about 10 percent by weight of the vinyl monomer.

6. A reflex reflector as in claim 2 wherein the curable resin composition comprises from about 10 to about 90 percent by weight of the unsaturated polyester and from about 90 to about 10 percent by weight of the vinyl monomer.

7. A reflex reflector as in claim 1 wherein the curable resin composition comprises from about 20 to about 75 percent by weight of the unsaturated polyester and from about 25 to about 80 percent by weight of the vinyl monomer.

8. A reflex reflector as in claim 2 wherein the curable resin composition comprises from about 20 to about 75 percent by weight of the unsaturated polyester and from about 25 to about 80 percent by weight of the vinyl monomer.

9. A reflex reflector as in claim 1 wherein the water soluble salt is selected from the inorganic alkaline and alkaline earth metal halides.

10. A reflex reflector as in claim 2 wherein water soluble salt is selected from the inorganic kalkine and alkaline earth metal halides.

11. A method as in claim 1 wherein the unsaturated polyester is comprised of dipropylene glycol and maleic anhydride and the vinyl monomer is styrene.

12. A method as in claim 2 wherein the unsaturated polyester is comprised of dipropylene glycol and maleic anhydride and the vinyl monomer is styrene.

13. A method as in claim 1 wherein the salt is sodium chloride and the suspending agent is polyvinyl alcohol.

14. A method as in claim 1 wherein the salt is sodium chloride and the suspending agent is polyvinyl alcohol.

15. An improved reflex light reflection of the type comprising a multiplicity of clear reflex reflective spheres affixed to a light reflective surface and arranged so that striking the spheres passes therethrough and is reflected by the light reflective surface back through the spheres toward the source of light wherein the improvement comprises using as the reflex reflective spheres polyester beads which are substantially spherical in shape and which are substantially free of internal voids, encapsulated matter and surface irregularities which are prepared by polymerizing a curable resin composition of from about 10 percent to about 90 percent by weight of an unsaturated polyester and from about 10 percent to about 90 percent by weight of a vinyl monomeric crosslinking agent in an aqueous suspension medium containing at least about 1.0 percent by weight based on the weight of the aqueous medium of a water soluble salt and from about 0.01 percent to about 2 percent by weight based on the weight of the aqueous medium of a suspending agent.

16. A reflex reflector as in claim 15 wherein the diameter of the polyester beads is from about 0.003 to about 0.05 inch.

17. An improved reflex light reflection of the type comprising a multiplicity of clear reflex reflective spheres affixed to a light reflective surface and arranged so that light striking the spheres passes therethrough and is reflected by the light reflective surface back through the spheres toward the source of light wherein the improvement comprises using as the reflex reflective spheres polyester beads which are substantially spherical in shape and which are substantially free of internal voids, encapsulated matter and surface irregularities which are prepared by suspension polymerizing a curable resin composition of from about 20 percent to about 75 percent by weight of an unsaturated polyester and from about 25 percent to about 80 percent by weight of a vinyl monomeric crosslinking agent in an aqueous suspension medium containing at least about 1.0 percent by weight based on the weight of the aqueous medium of a water soluble salt and from about 0.01 to about 2.0 percent by weight based on the weight of the aqueous medium of a suspending agent.

18. A reflex reflector as in claim 17 wherein the suspending agent is an organic polymeric suspending agent.

19. A reflex reflector as in claim 17 wherein the salt is sodium chloride and the suspending agent is polyvinyl alcohol.

20. A reflex reflector as in claim 17 wehrein the unsaturated polyester is comprised of dipropylene glycol and maleic anhydride and the vinyl monomer is styrene.

21. A reflex reflector as in claim 17 wherein said crosslinking agent is about 40 to about 95 percent by weight of styrene and about 5 to about 60 percent by weight of a lower alkyl acrylate or methacrylate.

22. A reflex reflector as in claim 17 which contains a U.V. stabilizer.

23. A reflex reflector as in claim 22 wherein the U.V. stabilizer is a lower alkyl acrylate or methacrylate.

* * * * *

UNITED STATES PATENT OFFICE
CERTIFICATE OF CORRECTION

PATENT NO. : 3,877,787
DATED : April 15, 1975
INVENTOR(S) : Lloyd R. Buzbee et al It is certified that error appears in the above-identified patent and that said Letters Patent are hereby corrected as shown below:

Col. 1, line 39 "beams" should read "beads"; col. 2, line 29 "pat.No." should read "Pat.No."; col. 2, line 66 "beams" should read "beads"; col. 9, line 25 "violet" should read "violent"; col. 10, line 59 "wihtin" should read "within"; col. 14, line 39 "under the under a" should read "under a"; col. 16, line 31 "variable" should read "variables"; Table 3 under "Passing Screen No." add new column No. "120" and add No. "1" on to the line of Ex. No. 17; col. 21, line 9 "molor" should read "molar"; col. 21, line 21 "uder" should read "under"; col. 22, line 1 "(2 to 3)" should read "(2- to 3)"; col. 22, line 15 "salt groups" should read "salt end groups"; col. 23, line 34 "90;" omit ";"; col. 26, line 30 "0.005" should read "0.05";

Signed and Sealed this eighteenth Day of November 1975

[SEAL]

Attest:

RUTH C. MASON
*Attesting Officer*

C. MARSHALL DANN
*Commissioner of Patents and Trademarks*